[11] 3,602,572

[72] Inventor Victor J. Norr[...]
Towson, Md.
[21] Appl. No. 780,658
[22] Filed Dec. 3, 1968
[45] Patented Aug. 31, 1971
[73] Assignee Westinghouse Electric Corporation
Pittsburgh, Pa.

[54] TWO-DIMENSIONAL OPTICAL BEAM SCANNER
10 Claims, 8 Drawing Figs.
[52] U.S. Cl.............................................. 350/7,
178/7.6
[51] Int. Cl..................................................... G02b 17/00
[50] Field of Search............................................. 350/6, 7,
199, 285; 178/7.6

[56] References Cited
UNITED STATES PATENTS
Re. 19,862 2/1936 Adsit........................... 350/7 X
[...],[...] [...] Stamps.......................... 350/7 X
2,997,539 8/1961 Blackstone.................... 350/7 X
3,023,662 3/1962 Hicks............................ 350/7
3,408,492 10/1968 Astheimer..................... 350/7 UX
3,436,546 4/1969 Derderian et al............. 350/7 X
3,494,688 2/1970 Rosin et al.................... 350/201

Primary Examiner—David Schonberg
Assistant Examiner—John W. Leonard
Attorneys—F. H. Henson, E. P. Klipfel and J. L. Wiegreffe ABSTRACT: Described is an optical beam scanner capable of transmitting large beam diameters over wide fields of view in two dimensions (i.e., full-frame scanning) at high scan rates. A wide field of view in one dimension of the scan is achieved by focusing an incident beam on a rotating optical assembly in such a manner that the beam is collimated and deflected through an angle that is the sum of the angle subtended by an individual optical element of the assembly and the angle that develops due to the varying off-axis position of the beam with respect to the optical element.

PATENTED AUG 31 1971 3,602,572

INVENTOR.
VICTOR J. NORRIS, JR.
BY Ernest P. Klipfel
ATTORNEY

TWO-DIMENSIONAL OPTICAL BEAM SCANNER

CROSS-REFERENCES TO RELATED APPLICATIONS

Copending application Ser. No. 780,636, filed Dec. 3, 1968 and assigned to the assignee of the present application.

BACKGROUND OF THE INVENTION

In copending application Ser. No. 780,626, filed Dec. 3, 1968 and assigned to the assignee of the present application an optical beam scanning system is shown which includes a rotating disc having spaced around its periphery a number of lenses or spherical mirrors in side-by-side relationship. A pyramid that has the same number of facets as there are optical elements is located in the center of the disc and rotates therewith. Each facet is located at the focal point of its associated lens or mirror; while the beam to be scanned is focused on these reflective facets. The facets redirect the beam to their companion lenses or mirrors; and as each optical element rotates through the angle it subtends, it collimates the beam and deflects it over this same angle. Further, since the principal axis of the lens is initially on one side of the beam, then coincident with it, and finally on the far side of the beam, an additional refractive angle is developed as a result of the off-axis position of the beam; and the direction of this angle is such that it magnifies the rotational or scan angle generated.

The systems shown in the aforesaid copending application, while capable of providing angular displacements of large beam diameters over wide fields of view, are generally limited to single line scanning. That is, they are not capable of scanning in two dimensions.

SUMMARY OF THE INVENTION

As an overall object, the present invention provides a new and improved optical scanning system employing a rotating member having a plurality of optical elements spaced around its periphery, together with a truncated pyramid at the center of the rotating member having facets which direct a beam of light through successive ones of the optical elements as the member rotates, and incorporating means for scanning in two dimensions.

Another object of the invention is to provide a two-dimensional mechanical optical beam scanning system in which the field of view can be varied to suit requirements.

In accordance with the invention, an optical scanning system is provided including a rotating disc having a number of lenses or spherical mirrors spaced around its periphery. Carried at the center of the rotating disc is a pyramid that has the same number of facets as there are optical elements. Each facet is located at the focal point of its associated lens or mirror; while the beam to be scanned is focused on one of these reflective facets which redirects the beam to its companion lens. As each lens rotates through the angle it subtends, and because the principal axis of the lens shifts from one side of the beam to the other, the total angle scanned by the system in one dimension comprises the angle subtended by the optical element plus an additional refractive angle which is developed as a result of the off-axis position of the beam.

Scanning in the other dimension can be achieved by incorporation of a rotating element within the lens system of the optical beam scanner. The rotating element, normally a polygon, preferably intercepts the beam prior to its being deflected by the aforesaid pyramid at a point where the beam is smaller than its ultimate transmitted size. Alternatively, two-dimensional scanning can be achieved by means of digital or optical deflecting devices, in which case the mechanical restrictions imposed by a rotating polygon are eliminated.

The above and other objects and features of the invention will become apparent from the following detailed description taken in connection with the accompanying drawings which form a part of this specification, and in which.

Figure 1:
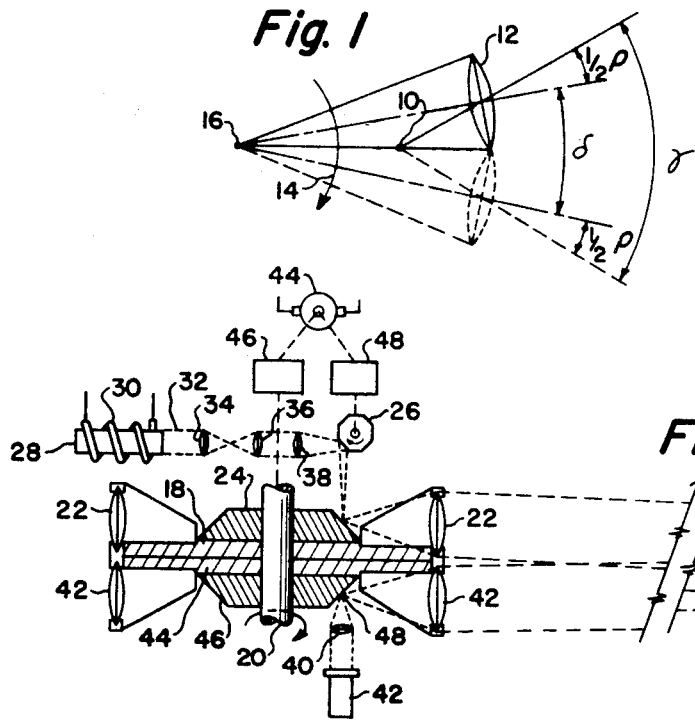
FIG. 1 illustrates the manner, in accordance with the invention, in which two angles are generated in concert to form a field of view in one dimension that is the sum of the two.

With reference now to the drawings, and particularly to FIG. 1, the point 10 represents the location of a stationary point light source located in the focal plane of a lens 12 which moves in the direction of arrow 14 from the full-line position shown to the lower dotted line position. $\delta$ indicates the angle through which the beam from source 10 is deflected as the lens 12 rotates through the angle it subtends in rotating about axis 16. $\rho$ indicates the angle through which the beam is refracted by virtue of its initial and final off-axis positions. $\gamma$, therefore, is the total angle scanned by the beam; and it will be readily appreciated that this angle is substantially larger than the angle traversed by the lens 12 about the axis 16. Thus, it can be seen that the angle through which the beam is deflected is the sum of the angle subtended by the lens 12 and the angle that develops due to the varying off-axis position of the beam with respect to the lens. As will be seen, the lens 12 can be replaced, for example, by means of a spherical mirror.

Figure 2:
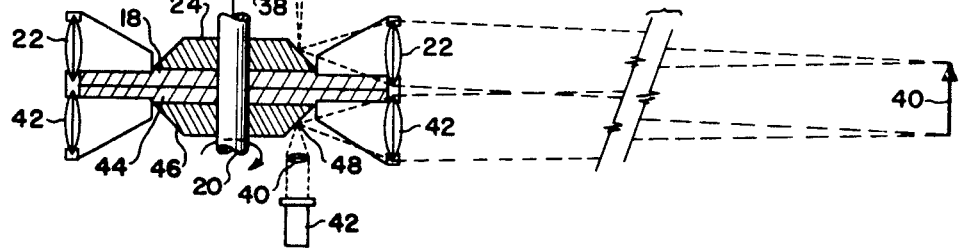
FIG. 2 depicts a typical configuration of the two-dimensional scanner of the invention wherein a rotating polygon is utilized to scan in one dimension and lenses are employed as the optical elements.
Figure 3:
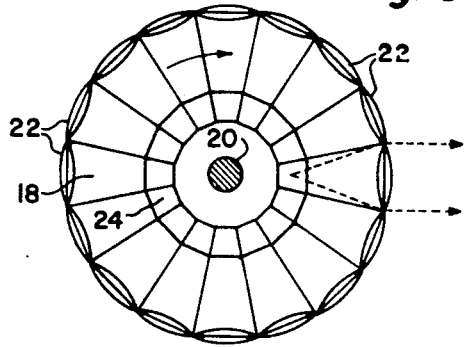
FIG. 3 is a top view of the scanner of FIG. 2.

With reference now to FIGS. 2 and 3, a typical configuration of the scanner for two-dimensional scanning is shown wherein lenses are employed as the optical elements. The system includes a table or disc 18 secured to a central shaft 20 and rotatable therewith. Circumferentially spaced around the periphery of the disc 18, on the top thereof, is a plurality of lenses 22, each having an axis extending through the central axis of the shaft 20, as perhaps best shown in FIG. 3. Also mounted on the disc 18 and concentric with the shaft 20 is a truncated pyramid 24 having a plurality of reflecting surfaces or facets corresponding to the number of lenses 22, the arrangement being such that a beam of light directed against the facets will be reflected through the lenses 22.

Above the pyramid 24 is a rotating polygon 26 having a plurality of reflecting facets. To the left of the rotating polygon 26 is a laser rod 28 surrounded by a flash tube 30. As will be appreciated, the laser rod is formed from paramagnetic material; and upon excitation by the flash tube 30 is capable of producing a beam 32 of monochromatic light. This beam of monochromatic light is focused by lenses 34, 36 and 38 onto a facet of the rotating polygon 26 where it is reflected down onto the facets of the rotating pyramid 24, the focal point of the lens 38 being at the surface of the facets on pyramid 24.

The light beam, after being reflected from the facets of pyramid 24, passes through an associated one of the lenses 22 and onto a distant object 40. The reflected light passes through one of a plurality of lenses 42 circumferentially spaced around the periphery of a lower disc 44 also provided with a truncated pyramid 46 having a plurality of reflecting facets or surfaces corresponding to the number of facets on pyramid 24 and aligned therewith. The light, after being focused into a point 48 on a facet of the truncated pyramid 46, is directed through a stationary lens 50 onto a photosensitive device, such as a photomultiplier 42.

Preferably, a single motor 44 drives both the rotating shaft 20 as well as the polygon 26. The motor 44, for example, is connected to shaft 20 through gear reducer 46; while it is connected to the rotating polygon 26 through gear reducer 48 such that the speed of rotation of the polygon is much greater than that of the shaft 20. In this manner, the polygon 26 is made to rotate and causes the beam to scan up and down in the vertical direction many times as the beam is caused to traverse a horizontal field of scan, thereby producing two-dimensional or full-frame scanning. As will be appreciated, however, only the increased angle of scan due to the refractive angles shown in FIG. 1 is achieved in the horizontal direction, the vertical scan being determined by the size of the facets on the rotating polygon 26.

Figure 4:
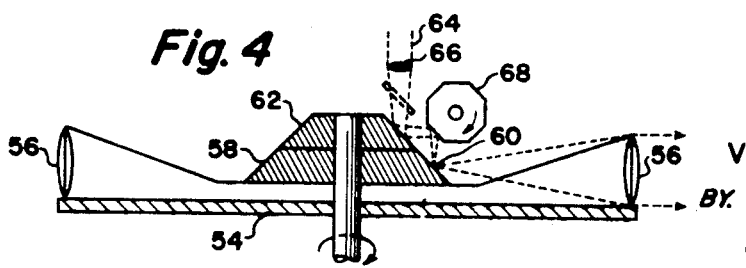
FIG. 4 is an embodiment of the invention employing a rotating polygon and capable of producing an underscanned field of view.

A system for underscanning in the horizontal direction is shown in FIG. 4 and again includes a rotating disc 54 having a plurality of lenses 56 circumferentially spaced around its periphery. A first truncated pyramid 58 having a plurality of reflecting facets is carried on the rotating disc 54; while a second truncated pyramid 62 is carried above the first and has a plurality of reflecting facets aligned with those of the truncated pyramid 58. The two pyramids 58 and 62 are arranged such that a light beam incident on the upper pyramid 62 will be deflected to the lower pyramid at a point 60 where the principal axis of the output optical element and a facet of the pyramid intersect. As the entire assembly rotates, the beam will always be located on the principal axis of the output element and no refractive angles will be generated as shown in FIG. 1. Thus, an incident beam 64 passing through a stationary input lens 66 is directed onto a facet of the upper pyramid 62, thence onto the facets of a rotating polygon 68, and then down onto a facet of the lower pyramid 58. From the facet of the lower pyramid 58, the light is directed through the lens 56.

The rotating polygon 68 rotates about a stationary axis such that the beam will always be located on the principal axis of the output lens 56 and will not sweep across the facet as shown in FIG. 1. Consequently, the conditions required for generation of a refractive angle as shown in FIG. 1 are not satisfied, and only the rotational angle is generated and scanned in the horizontal direction in the same time period as is normally used to generate both the refractive and rotational angles. The arrangement of FIG. 4, however, does not alter the vertical scan field of view.

As will be appreciated, the two rotating reflecting elements shown in the embodiment of the invention of FIG. 2, for example, require a rather complicated mechanical assembly. If large beam diameters are employed in an effort to ultimately bring the beam to a sharp focus or to project a highly collimated beam, these rotating elements become quite large. The large sizes limit the scanner to somewhat slow scan rates, are heavy, require large volumes, and usually adversely influence structural and dynamic considerations.

Figure 5:
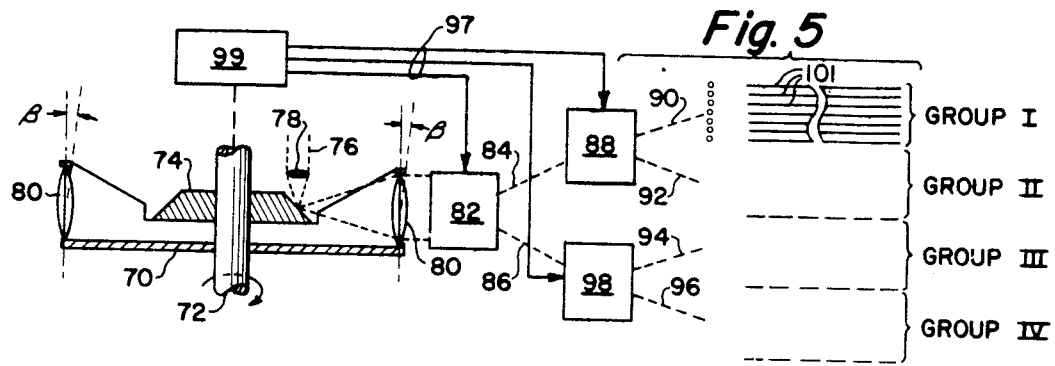
FIG. 5 illustrates still another embodiment of the invention for expanding the vertical field of scan by means of digital deflectors.

A system for generating two-dimensional scans which does not require as many mechanical components as that of FIG. 2 is shown in FIG. 5. It again includes a circular disc 70 mounted for rotation on a rotating shaft 72 and provided with a truncated pyramid 74 having a plurality of reflecting facets. A stationary light beam 76 is directed through a stationary lens 78 onto the facets of the rotating pyramid 74, and thence through the rotating lenses 80 spaced around the periphery of the disc 70.

In this case, each of the lenses 80 is disposed at an angle $\beta$ between the plane of the lens and horizontal (i.e., normal to the plane of rotation). The angles $\beta$ vary for each lens 80. Note, for example, that the angle $\beta$ for the lens 80 to the right of shaft 72 projects radially outwardly from horizontal; while the angle $\beta$ for the lens 80 to the left of shaft 72 extends radially inwardly. Thus, as the disc 70 rotates, the beam is deflected one increment in the vertical direction each time a lens 80 rotates past the light beam.

This vertically deflected beam is then applied to a first electrooptical digital deflector 82 where the beam can be deflected as beam 84 or beam 86. Assuming that the incident beam is deflected as beam 84, it is applied to a second digital deflector 88 where it can be deflected as either beam 90 or beam 92. Similarly, assuming that the incident beam is deflected downwardly as beam 86, it is applied to electrooptical digital deflector 98 where it can be deflected as beam 94 or beam 96. The direction in which the beams are deflected by deflectors 82, 88 and 98 will depend upon the states of electrical signals applied thereto via leads 97; and these signals, in turn, are controlled by a synchronizer 99 mechanically coupled to the rotating shaft 72. Let us assume, for example, that there are eight lenses spaced around the periphery of disc 70. During the first full revolution of disc 70, the electrical signals applied to deflectors 82 and 88 will be such as to cause deflector 82 to deflect the beam upwardly as beam 84 and cause deflector 88 to deflect its incident beam upwardly as beam 90. Now, as the disc rotates, passage of each lens 80 past the incident beam will cause a scan 101 to be produced in Group I of the field of view, the respective scans 101 being one below the other because of the variable off-axis positioning of the lenses (i.e., the angles $\beta$) about disc 70.

Following the first complete revolution of disc 70, synchronizer 99 alters the signals to the deflectors such that beams 84 and 92 are generated, thereby producing the scan lines in Group II of the field of view during the second revolution of the disc 70. On the third revolution, beams 86 and 94 are produced to generate the scan lines in Group III of the field of view and during the fourth revolution beams 86 and 96 are produced to generate the scan lines in Group IV. At this point, the cycle repeats through four revolutions of disc 70, starting at the top of Group I.

The number of horizontal scan lines that can thus be generated is equal to $2^N$ times the number of lenses 80, N being the number of binary deflecting stages in cascade that are employed. In the example given in FIG. 5, for example, N is 2; and assuming that the number of lenses 80 is eight, then 32 horizontal scan lines can be produced in the scan pattern in succession.

Figure 6:
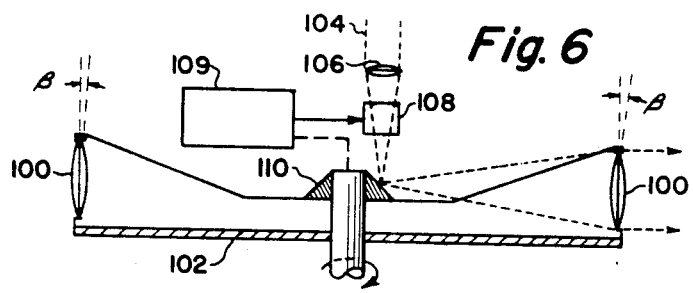
FIG. 6 illustrates still another embodiment of the invention employing an analog deflector for producing a vertical scan.

FIG. 6 depicts another scanner version that may be used to achieve the same pattern. Here, again, a plurality of lenses 100 is circumferentially spaced around the periphery of a rotating disc 102, each lens being at an angle $\beta$ with respect to horizontal, and the respective angles $\beta$ varying for each lens 100 spaced around the disc 102. In this case, a stationary light beam 104 passes through a stationary lens 106 and thence to an electrically controlled analog deflector 108. From the deflector 108 the beam is focused into a spot on the reflecting facets of a truncated pyramid 110 and thence through the lenses 100. With the arrangement shown, the optical assembly will generate a scan pattern such as that shown in Group I of FIG. 5 as the disc 102 rotates through one complete revolution. After the first revolution is completed, the analog deflector 108, through synchronizer 109, causes the beam to be deflected in a discrete step along the radius of the disc 102, whereupon a second group of scan lines is generated below, or above, the first. In this manner, the angle generated in the vertical direction is limited only by the extent to which the analog device may deflect the beam across the focal plane of the optical element without incurring severe optical distortion. Here, again, the output optical elements on the periphery of disc 102 may be either spherical mirrors or lenses. The lenses may either collimate the beam or, following collimation, focus the beam at a distant point.

As will be understood, in the embodiments of the invention described to this point, the field of view of the scanner can be changed only in discrete increments and then at a considerable cost in mechanical complexity. Each incremental change will require directing the incident beam to a separate rotating element that has a different number of facets and, upon reflection, redirecting the beam back to the axis it had originally traversed. The lens cannot be used to modify the angular deflection of the collimated beam since the beam's diameter at its point of origin is the same as its transmitted diameter. A lens placed in the path of the beam and focused at the beam's origin does not see a point source and, therefore, degrades the beam's collimation.

The angle generated by rotational-refractive scanners actually originates at a point source. A lens placed between this point and the output optical element can change the focal length of the output element without comprising the ability of the element to collimate the beam. The lens, in conjunction with appropriate refractive devices placed about both the output element and the stationary input lens may be varied such that the field of view is continuously changed while the collimation of the beam is retained.

Figure 7:
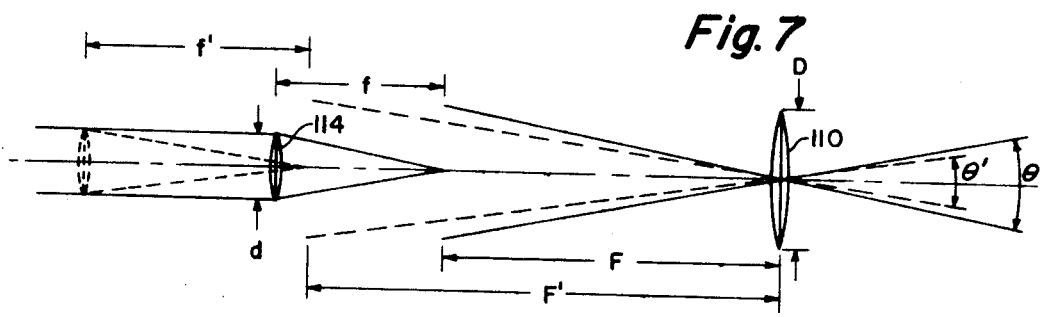
FIG. 7 illustrates the optical relationships involved in producing an optical beam scanner with a continuously variable field of view.
Figure 8:
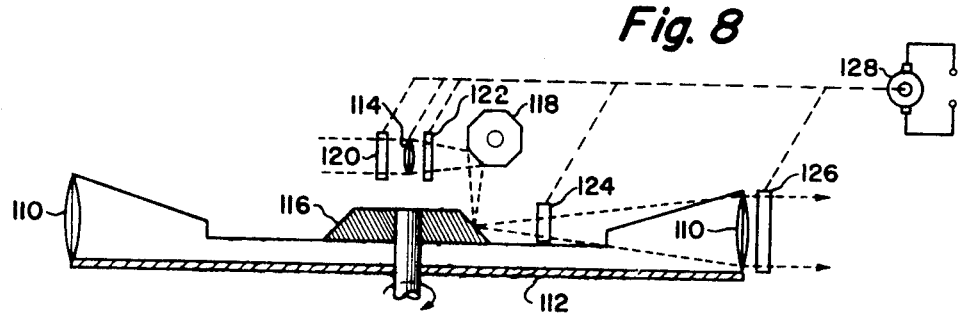
FIG. 8 is an embodiment of a typical two-dimensional scanner with variable field of view capability.

FIG. 7 shows an optical schematic of a rotational-refractive-type scanner and depicts the manner in which the optical relationships can be changed to alter the scanner's field of view. One field of view in FIG. 7 is identified by the angle $\theta$ and the smaller, reduced field of view is indicated by the angle $\theta'$. The output optical element, comprising a lens 110 mounted on the periphery of a rotating disc 112 as shown in FIG. 8 has a diameter D; while an input stationary lens 114 has a diameter d. As the focal length of the output element increases, the field of view decreases. Thus, as the focal length of lens 110 changes from F to F', the field of view decreases from the angle $\theta$ to the angle $\theta'$. At the same time, the $f$-number of the beam must remain constant in the process. That is:

$$f\text{-number} = (f/d) = (F/D) = (f'/d) = (F'/D)$$

where:
$f$ is the focal length of lens 114 for the angle $\theta$ and
$f'$ is the focal length of the lens 114 for the angle $\theta'$.

FIG. 8 illustrates the manner in which the optical elements are coupled in a practical application. The system again includes a truncated pyramid 116, and a rotating polygon 118 for scanning in the vertical direction. On either side of the input lens 114 are translating refractive elements 120 and 122; and on opposite sides of the output lens 110 is a second pair of translating elements 124 and 126. The elements 120, 122, 124 and 126 are mechanically coupled to a drive motor 128 along with the input lens 114. The input lens 114 is moved further out in the beam's path and then varies in concert with the positions of the refractive elements 120–126. The focal length of the output lens 110 may, therefor, be continuously increased or decreased in this fashion and its field of view continually changed as a consequence. The collimation of the beam is preserved since both the input lens and the output lens always share the same focal plane.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. In a two-dimensional optical scanning system, a rotating disc, a plurality of lenses carried on said disc and spaced around its periphery in side-by-side relationship, pyramid means at the center of said disc and operatively connected thereto so as to rotate therewith, the sides of said pyramid means defining a number of plane reflecting facets equal to the number of lenses, each facet being located at the focal plane of an associated lens, and means for producing a light beam and for focusing said beam into a spot which intersects the focal planes of said lenses on said reflecting facets such that the beam of light will be reflected in one dimension from each facet to its associated lens so that the principal axis of said lens is initially on one side of the beam, then coincident with it, and finally on the other side of the beam, whereby the angle scanned by the beam in said one dimension will comprise the angle through which the beam is deflected as the lens rotates through the angle it subtends plus the refractive angles produced by virtue of the initial and final off-axis positions of the beam with respect to the principal axis of the lens, and means in the path of said beam for causing said beam to scan in a second dimension at right angles to said first dimension.

2. The system of claim 1 wherein the means for causing said beam to scan in said second direction comprises a rotating polygon having a plurality of reflective facets interposed between said means for producing a light beam and the rotational path of travel of said facets.

3. The system of claim 2 wherein said polygon rotates at a higher speed than said rotating disc.

4. The system of claim 1 wherein said means for causing the beam to scan in a dimension at right angles to the first-mentioned dimension comprises a plurality of electrooptical beam deflectors arranged in cascade.

5. The system of claim 4 wherein the beam at the output of said lenses is directed to a first beam deflector capable of deflecting the beam to either a second or a third beam deflector, the second and third beam deflectors each being capable of deflecting the beam to either a first or a second position.

6. The system of claim 4 wherein each lens is disposed at an angle with respect to a line normal to the plane of rotation of said rotating disc, said angles being different for each lens.

7. The system of claim 1 wherein each of said lenses is disposed at an angle with respect to a line extending normal to the plane of rotation of said rotating disc with each of said angles for the respective lenses being different from the angles for the other lenses.

8. The system of claim 7 including an analog electrooptical deflector for deflecting an incident beam from one position to another on the facets of said rotating truncated pyramid each time said rotating disc rotates through a complete revolution.

9. The system of claim 1 including means for continually increasing or decreasing the field of view of said lenses.

10. The system of claim 9 wherein the means for directing said light beam into the rotational path of travel of said facets includes an input lens, translating refractive elements on either side of said input lens, translating refractive elements on either side of the rotational path of travel of said lenses carried on the disc and in the path of said light beam, and means for moving said input lens and said translating refractive elements in unison.